(12) United States Patent
Seguchi et al.

(10) Patent No.: US 6,501,190 B1
(45) Date of Patent: Dec. 31, 2002

(54) ACCESSORY DEVICE DRIVING APPARATUS FOR VEHICLES

(75) Inventors: Masahiro Seguchi, Obu (JP); Yasuaki Yukawa, Toyoake (JP)

(73) Assignee: Denso Corporation, Kariya (JP)

( * ) Notice: Subject to any disclaimer, the term of this patent is extended or adjusted under 35 U.S.C. 154(b) by 65 days.

(21) Appl. No.: 09/679,063

(22) Filed: Oct. 5, 2000

(30) Foreign Application Priority Data

Oct. 28, 1999 (JP) ............................................. 11-306943

(51) Int. Cl.[7] ................................................ F02N 11/04
(52) U.S. Cl. ............................ 290/46; 290/49; 180/65.2
(58) Field of Search ............................... 290/46, 40 R, 290/49, 51; 310/114, 112; 180/65.4, 65.2

(56) References Cited

U.S. PATENT DOCUMENTS

| | | | | | |
|---|---|---|---|---|---|
| 3,925,696 A | * | 12/1975 | Popov et al. | ............... | 310/242 |
| 5,281,880 A | * | 1/1994 | Sakai | ......................... | 192/48.2 |
| 5,635,805 A | | 6/1997 | Ibaraki et al. | ............... | 318/139 |
| 5,675,203 A | * | 10/1997 | Schulze et al. | ............. | 310/103 |
| 5,744,895 A | | 4/1998 | Seguchi et al. | ............. | 310/266 |
| 5,755,303 A | | 5/1998 | Yamamoto et al. | ........ | 180/65.2 |
| 5,793,136 A | * | 8/1998 | Redzic | ....................... | 310/112 |
| 5,856,709 A | * | 1/1999 | Ibaraki et al. | ............... | 180/165 |
| 5,991,683 A | * | 11/1999 | Takaoka et al. | ........... | 180/65.2 |
| 6,048,288 A | * | 4/2000 | Tsujii et al. | ............... | 180/65.4 |
| 6,098,735 A | * | 8/2000 | Sadarangani et al. | ........ | 180/165 |
| 6,121,705 A | * | 9/2000 | Hoong | ........................ | 310/103 |
| 6,135,919 A | * | 10/2000 | Shimakura | .................. | 184/27.2 |
| 6,184,603 B1 | * | 2/2001 | Hamai et al. | .............. | 180/65.2 |
| 6,251,042 B1 | * | 6/2001 | Peterson et al. | ................ | 477/3 |

FOREIGN PATENT DOCUMENTS

| | | |
|---|---|---|
| JP | 10-248205 | 9/1998 |
| JP | 10-336804 | 12/1998 |
| JP | 11-164535 | 6/1999 |

* cited by examiner

*Primary Examiner*—Joseph Waks
(74) *Attorney, Agent, or Firm*—Oliff & Berridge, PLC

(57) ABSTRACT

An accessory device driving apparatus is disposed between an internal combustion engine and an accessory device of a vehicle. The driving apparatus is constructed as a coaxial dual rotor-type electric motor/generator that has two electromagnetically induction-coupled rotors to operate as a motor and a generator. One rotor is coupled with the engine to rotate at a speed higher than that of the engine, and the other rotor is coupled with the accessory device to rotate at a speed higher than that of the accessory device. The rotors are restricted from rotating in a reverse direction opposite a direction of forward rotation of the engine by one-way clutches, respectively.

14 Claims, 6 Drawing Sheets

ACCESSORY DEVICE DRIVING APPARATUS FOR VEHICLES

CROSS REFERENCE TO RELATED APPLICATION

This application relates to and incorporates herein by reference Japanese Patent Application No. 11-306943 filed Oct. 28, 1999.

BACKGROUND OF THE INVENTION

The present invention relates to an accessory device driving apparatus for vehicles that is disposed between an internal combustion engine and an accessory device to be driven by the internal combustion engine.

JP-A-10-336804 proposes one type of accessory device driving apparatuses for vehicles. This driving apparatus is constructed as an accessory device driving motor that is a rotary electric machine, that is, a motor/generator unit for starting an internal combustion engine of a vehicle and generating electric power. The driving apparatus has a clutch mechanism between the engine and the generator/motor unit to continue to drive the accessory device of the vehicle during the engine is held at rest for a moment (idle-stop), for instance, at intersections. Specifically, in this instance, the clutch mechanism operates to disengage the generator/motor unit from the engine so that the generator/motor unit drives the accessory device. The clutch mechanism, which generally comprises a pair of friction-type rotary disks and a disk driving device, is required to be simple in construction and durable for a long period of use.

SUMMARY OF THE INVENTION

It is therefore an object of the present invention to provide an accessory device driving apparatus for vehicles that meets required demands, such as simple construction and long durability.

According to the present invention, an accessory device driving apparatus for a vehicle is constructed as a coaxial dual rotor-type motor/generator. A first rotor is rotatably supported in a housing and coupled with an engine in a torque transfer manner therebetween, and a second rotor is rotatably supported in the housing and coupled with an accessory device in a torque transfer manner therebetween. One of the rotors is connected to a battery in an electric power transfer manner and positioned to face another of the rotors in an electromagnetically induction-coupled manner and in a relatively rotatable manner. For the electromagnetic induction coupling between the rotors, one rotor is an armature-type having armature coils and the other rotor is a rotating magnetic field generating-type. The rotating magnetic field may be provided by the use of permanent magnets or field coils.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
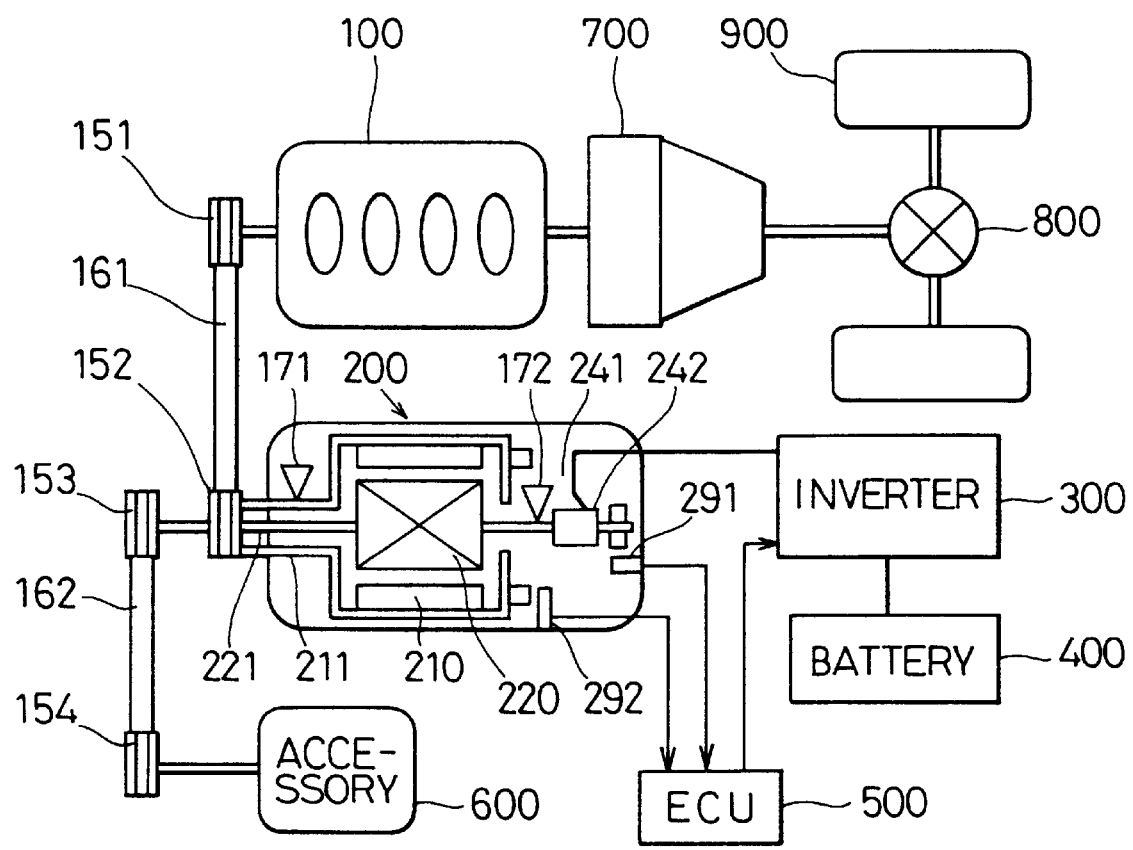
FIG. 1 is a schematic diagram showing a vehicle driving system that uses an accessory device driving apparatus for vehicles according to a first embodiment of the present invention.

The present invention will be described in further detail with reference to various embodiments, in which the same or similar parts are designated with the same or similar reference numerals for brevity.

First Embodiment

Referring first to FIG. 1, a vehicle driving system comprises an internal combustion engine 100 of a vehicle, a motor/generator unit 200, an inverter 300, a storage battery 400, an electronic control unit (ECU) 500, an accessory device 600, a transmission 700 of the vehicle, a differential gear 800 and drive wheels 900. The motor/generator unit 200 is an accessory device driving apparatus, and the accessory device 600 is a load such a compressor for an air conditioner of the vehicle.

The motor/generator unit 200 includes a first rotor 210 and a second rotor 220 to operate as a coaxial, dual rotor-type electric generator/motor. The motor/generator unit 200 is for driving the accessory device 600 as an electric motor and for generating, while transmitting output power of the engine to the accessory device 600, electric power as an electric power generator. The first rotor 210 has a rotary shaft 211 on which a pulley 152 is fixed, and the second rotor 220 has a rotary shaft 221 on which a pulley 153 is fixed. The pulley 152 is coupled with a pulley 151 of the engine 100 via a drive belt 161 for a torque transmission between the engine 100 and the first rotor 210 of the motor/generator unit 200. The pulley 153 is coupled with a pulley 154 of the accessory device 600 via a drive belt 162 for a torque transmission between the second rotor 220 and the accessory device 600.

The motor/generator unit 200 further includes one-way clutches 171 and 172 that restrict the first rotor 210 and the second rotor 220, respectively, not to drive the engine 100 in reverse against the forward rotation direction of the engine 100.

Rotation sensors 291 and 292 are provided to detect rotation positions of the rotors 220 and 210, respectively.

The inverter 300 is constructed as a three-phase inverter circuit which converts a.c. power to d.c. power. The inverter 300 supplies electric power from the battery 400 to armature coils of the second rotor 220 through brushes 241 and slip rings 242, and supplies electric power in reverse from the second rotor 220 to the battery 400. The ECU 500 is constructed to control the inverter 300 in response to output signals of the rotation sensors 291 and 292. Specifically, the ECU 500 detects the rotary positions of the rotors 210 and 220 from the output signals of the rotation sensors 291 and 292, and calculates position, current and phase of excitation current supplied through the inverter 300.

Figure 2:
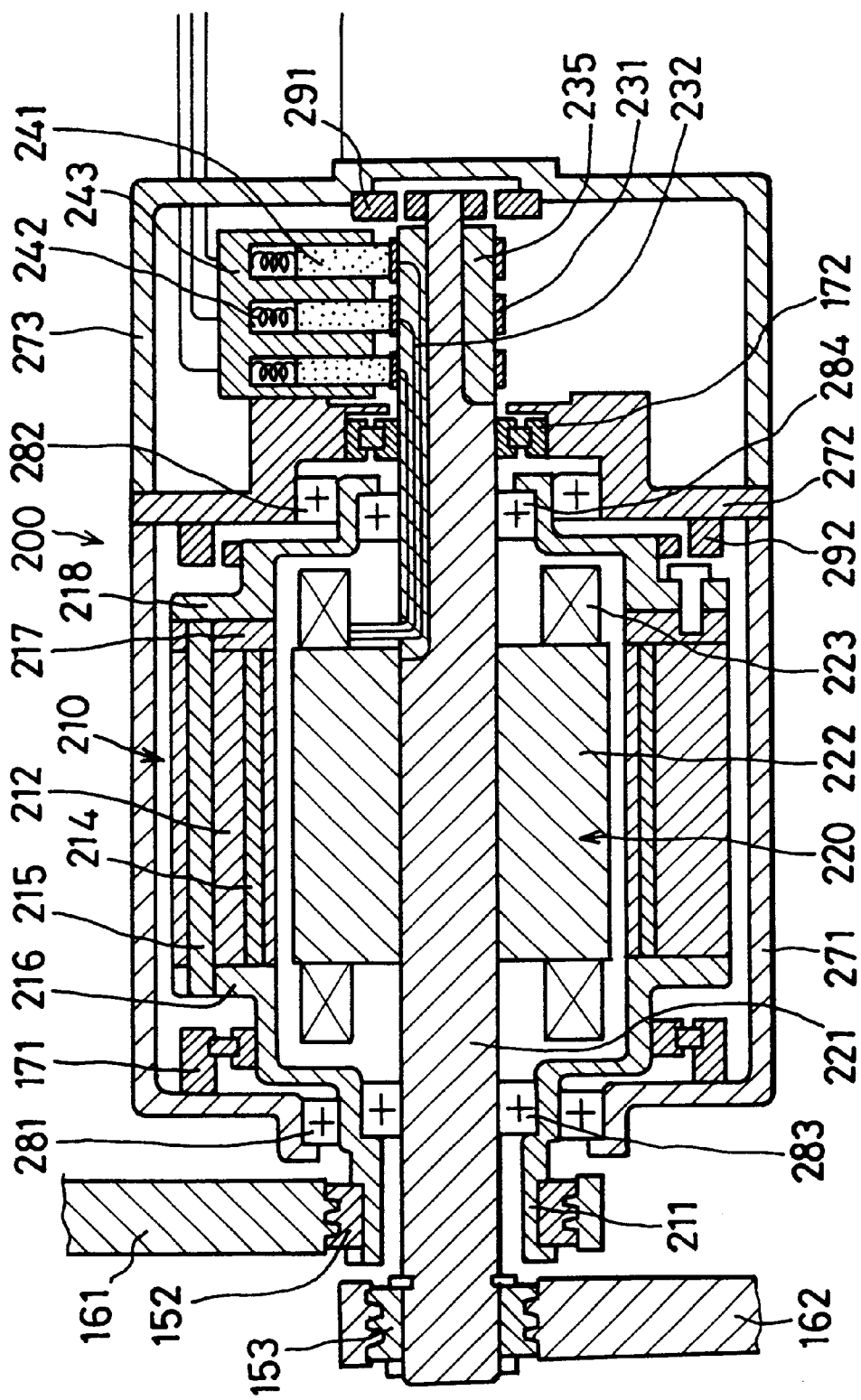
FIG. 2 is a sectional view showing the accessory device driving apparatus of the first embodiment.

The motor/generator unit 200 is constructed as shown in FIG. 2 in detail.

The first rotor 210 includes a cylindrical rotor core 212, field magnets 214, fixing pins 215, a front frame 216, a fixing plate 217 and a rear frame 218. The front frame 216 is formed in generally a cylindrical shape and to provide the rotary shaft 211 at its one end. The rotor core 212 is sandwiched between the front frame 216 and the fixing plate 27 and the rear frame in the axial direction in such a manner that those are tightly fixed one another by the fixing pins 215. The field magnets 214 are arranged at the inner wall side of the first rotor 210 and separated one another in the circumferential direction. The first rotor 210 is rotatably supported in a cylindrical or cup-shaped front housing 271 and a disk-shaped rear housing 272 by bearings 281 and 282, respectively. The rear housing 272 is fixed to the front housing 271.

The one-way clutch 171 is a type known well in the art. It has an outer lace fixed to the inside of the end wall of the front housing 271 and an inner lace fixed to the outside of the front frame 216. It also has a torque transmitting member disposed between the outer lace and the inner lace to allow the inner lace, that is, the first rotor 210, to rotate only in one direction. In this embodiment, the one-way clutch 171 is constructed to allow the first rotor 210 to rotate only in the rotation direction of the engine 100 and disable the same to rotate in the reverse direction.

The second rotor 220 includes a cylindrical core 222 fixed to the rotary shaft 221 and three-phase armature coils 223 wound on the core 222. The shaft 221 is rotatably supported in the front frame 216 and the rear frame 218 by bearings 283 and 284, respectively.

The one-way clutch 172 also is a type known well in the art. It has an outer lace fixed to the rear housing 272 and an inner lace fixed to the shaft 221. It also has a torque transmitting member disposed between the outer lace and the inner lace to allow the inner lace, that is, the second rotor 220, to rotate only in one direction. In this embodiment, the one-way clutch 172 is constructed to allow the second rotor 220 to rotate only in the rotation direction of the engine 100 and disable the same to rotate in the reverse direction.

The slip rings 231 are provided on the shaft 22 of the second rotor 220 and electrically connected to armature coils 223 through electric conductors 232 embedded in the insulating material 235. The insulating material 235 electrically insulates the conductors 232 one another, and insulates the slip rings 231 and the conductors 232 from the shaft 221. Brushes 241 are biased by springs 242 to contact the slip rings 231, respectively, and connected to the inverter 300. The brushes 241 and the springs 242 are held in position in a holder 243. The slip rings 231 and the brushes 241 are covered with a cover 273 fixed to the rear housing 272.

In the above embodiment, the absolute angular velocity of the rotating magnetic field generated by the armature coils 223 of the second rotor 220 is determined in correspondence with the angular velocity $\omega 1$ of the rotating magnetic field of the first rotor 210. This absolute angular velocity is a sum of the angular velocity $\omega 2$ of the second rotor 220 and the angular velocity ($\omega 1-\omega 2$) of the armature current. Assuming that the torque (electromagnetic coupling torque) between the rotors 210 and 220 is T and there is no loss, the engine 100 drives the accessory device 600 with a motive power of $T \cdot \omega 2$ and the remaining power $T \cdot (\omega 1-\omega 2)$ is supplied as the generated power to the battery 400 or other electric loads.

The pulley 152 has a diameter smaller than that of the pulley 151 so that the first rotor 210 may rotate at speeds higher than that of the engine 100. The pulley 153 has a diameter smaller than that of the pulley 154 so that the second rotor 220 may rotate at speeds higher than that of the accessory device 600. Thus, the motor/generator unit can be sized small.

The above first embodiment operates as follows.

Figure 3:
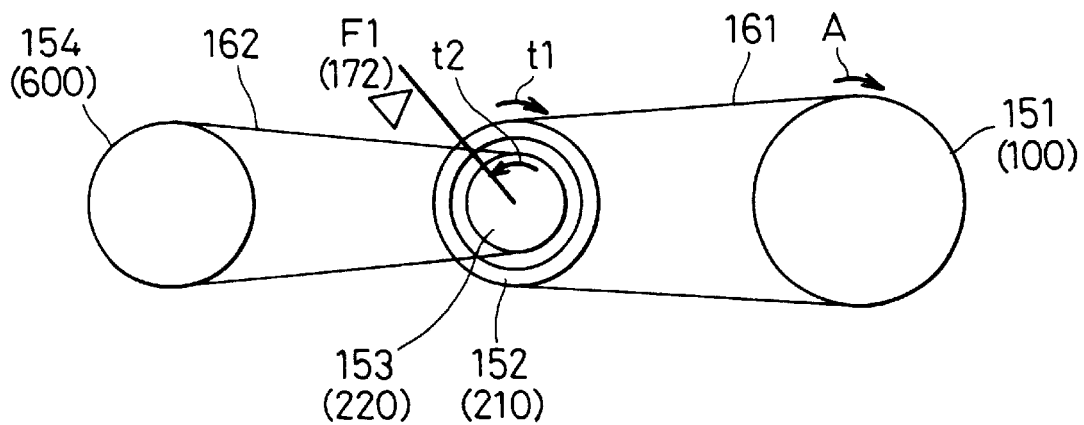
FIG. 3 is a schematic diagram showing a torque transmission mode of the accessory driving apparatus of the first embodiment in engine starting operation.

In an engine starting operation in which the engine 100 is to be started, the motor/generator unit 200 operates as a motor. The armature coils 223 of the second rotor 220 are excited by the current of the battery 400. The inverter 300 controls the phase of the excitation current in response to the positional relation between the first rotor 210 and the second rotor 220 detected by the rotation sensors 191 and 192. As a result, the first rotor 210 and the second rotor 220 generate rotary torques t1 and t2 (t2=−t1) in the directions shown in FIG. 3, respectively. The torque t1 of the first rotor 210 is transmitted to the engine 100 through the pulleys 151, 152 and the belt 161, thus starting the engine 100 in the forward direction A. The one-way clutch 172 restricts by a restriction force F1 the second rotor 220 from rotating in the direction opposite the forward rotation direction A of the engine 100.

Figure 4:
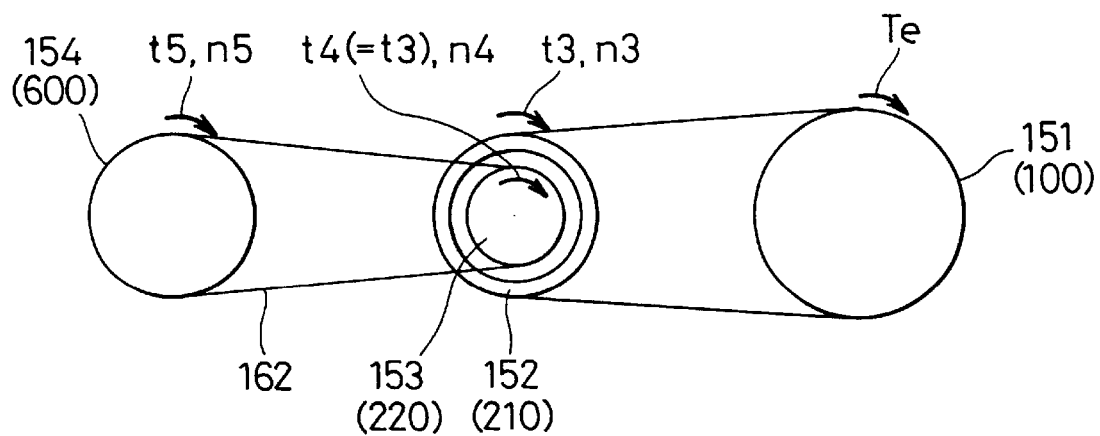
FIG. 4 is a schematic diagram showing a torque transmission mode of the accessory driving apparatus of the first embodiment in power generating operation.

In a power generating operation in which the engine 100 rotates and generates a torque Te for driving the vehicle, the motor/generator unit 200 operates as the motor and the generator. The first rotor 210 is rotated at a speed n3 by a torque t3 (t3<Te) transmitted from the engine 100 as shown in FIG. 4. Immediately after the engine starting, the armature coils 223 usually generate electric power. The second rotor 220 follows to rotate by a torque t4(t4=t3) at a speed n4 in the same rotation direction as the first rotor 210. This rotation of the second rotor 220 is transmitted to the accessory device 600 through the pulleys 153, 154 and the belt 162. A torque t5 transmitted to the accessory device 600 and a rotation speed n5 of the accessory device 600 are defined as follows with the ratio of diameters of the pulleys 153 and 154 being Mk2:Mh.

$T5 = Mh/Mk2 \cdot t4$ $n5 = Mk2/Mh \cdot n4$

The rotation speed n4 of the second rotor 220, that is, the relative speed between the first rotor 210 and the second rotor 220, can be varied by regulating the timing and the amount of the excitation current supplied to the armature coils 223.

Specifically, when the electric power generation for charging the battery 400 is required or the accessory device 600 is to be driven at low speeds, the electric load of the motor/generator unit 200 is reduced and the relative speed is increased so that the armature coils 223 generate the electric power. When the electric power generation is to be reduced or the accessory device 600 is to be driven at high speeds, the load to the motor/generator unit 200 is increased and the relative speed is decreased while maintaining the electric power generation of the armature coils 223. Further, when the power generation is to be increased and the accessory device 600 is to be driven at high speeds, the engine rotation speed is increased. When the power generation is not required nor the accessory device 600 need not be driven, the engine rotation speed is decreased.

Figure 5:
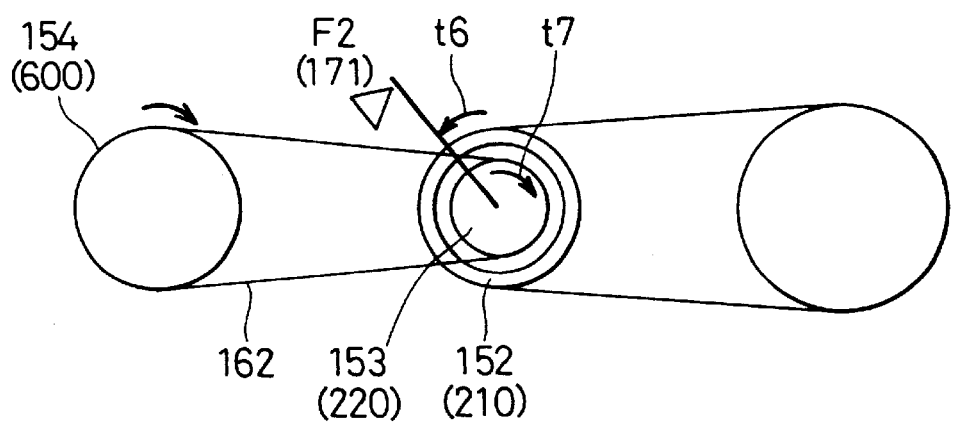
FIG. 5 is a schematic diagram showing a torque transmission mode of the accessory driving apparatus of the first embodiment in engine idle-stop operation.

In an engine idle-stop operation in which the engine 100 is stopped and the accessory device 600 is continued to be driven, the motor/generator unit 200 operates as a motor. The armature coils 223 of the second rotor 220 is supplied with the excitation current from the battery 400 through the inverter 300 so that the first rotor 210 rotates in the direction opposite the direction of rotation in the engine starting mode (FIG. 3) as shown in FIG. 5. Though the rotor 210 generates torque t6, the one-way clutch 171 restricts the rotation of the first rotor 210 by the restriction force F2. The second rotor 220 rotates with a reaction torque t7 to drive the accessory device 600.

Figure 6:
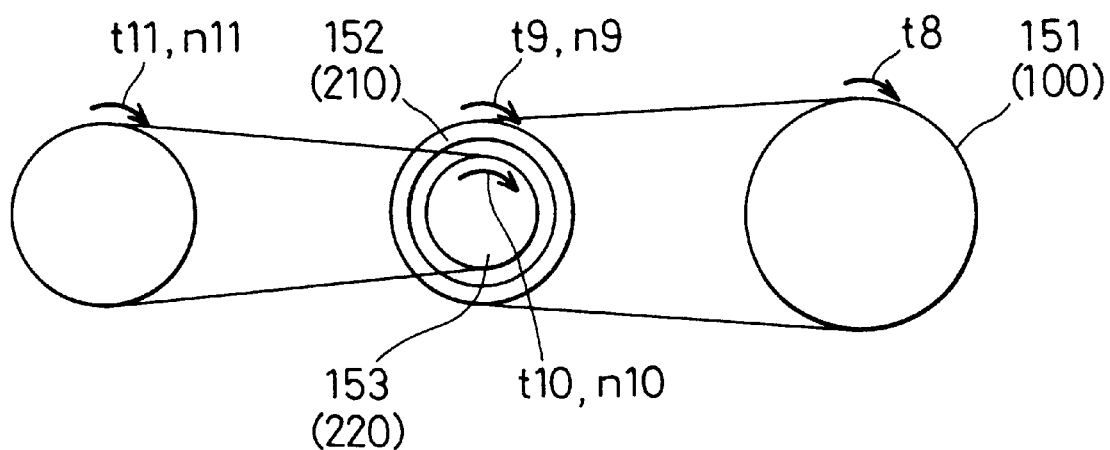
FIG. 6 is a schematic diagram showing a torque transmission mode of the accessory driving apparatus of the first embodiment in power restoring operation.

In a power restoring operation in which the engine 100 is decelerated, an inertial torque t8 of the engine 100 is transmitted to the first rotor 210 so that the motor/generator unit 200 operates as a generator for generating the electric power by the use of the inertial torque of the engine 100. The second rotor 220 follows the first rotor 210 to rotate in the same manner as in the power generating operation (FIG. 4) as shown in FIG. 6. The rotor 220 drives the accessory device 600. It is assumed in FIG. 6 that torques and rotation speeds of the first rotor 210, second rotor 220 and the accessory device 600 are t9, n9, t10, n10, and t11, n11, respectively.

In this power restoring operation, the motor/generator unit 200 is controlled to generate the electric power by regulating the excitation current to the armature coils 223 of the second rotor 220 under the condition that the rotation speeds n9 and n10 of the first rotor 210 and the second rotor 220 are maintained as n9>n10. As a result, the electric power can be restored to the battery 400 while driving the accessory device 600. It is preferred to increase the load of the battery 400 and the accessory device 600 than in the normal condition so that the following torque assisting operation can be attained smoothly.

Figure 7:
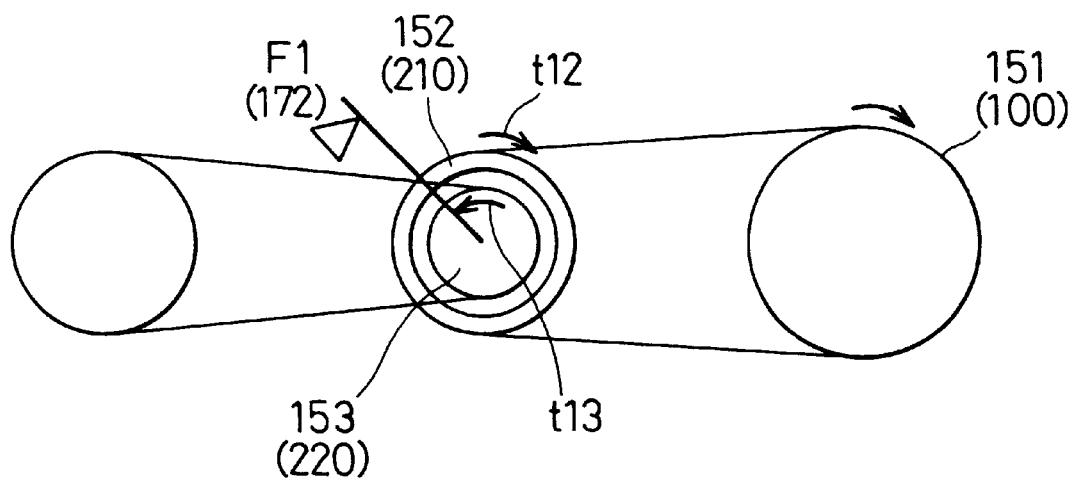
FIG. 7 is a schematic diagram showing a torque transmission mode of the accessory driving apparatus of the first embodiment in torque assisting operation.

In a torque assisting operation in which the engine 100 is accelerated, the motor/genrator unit 200 operates as a motor to supply the engine 100 with motive power thereby to assist a vehicle drive power. When the engine acceleration is detected, the armature coils 223 are excited with the excitation current and the accessory device 600 is restricted from being driven. The first rotor 210 generates torque t12 as shown in FIG. 7 in the same direction as in the engine starting operation (FIG. 3) so that the torque t2 is transmitted to the engine 100. In this instance, the one-way clutch 172 restricts the second rotor 220 from rotating in the opposite direction due to a reaction torque t13.

Second Embodiment

Figure 8:
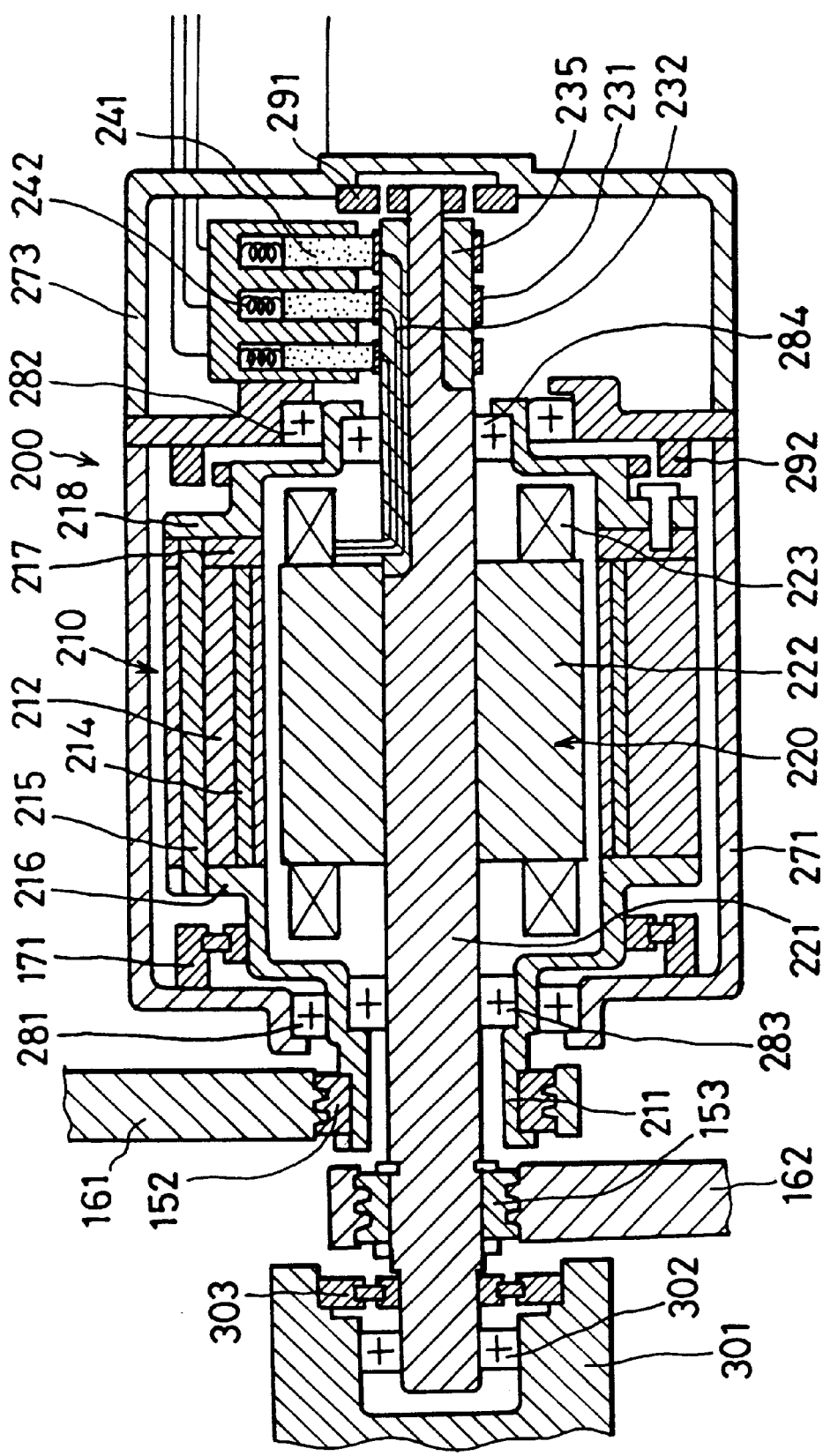
FIG. 8 is a sectional view showing an accessory device driving apparatus for vehicles according to a second embodiment of the present invention.

In a second embodiment, as shown in FIG. 8, a one-way clutch 303 is used in place of the clutch 172 in the first embodiment (FIGS. 1 and 2). The rotary shaft 221 of the second rotor 220 is supported rotatably in a fixing member 301 via a bearing 302. The fixing member 301 is fixed to the engine 100 or to a vehicle chassis (not shown). The clutch 303 disables the second rotor 220 from rotating in a direction opposite the rotation direction of the engine 100. Specifically, the clutch 303 is provided between the fixing member 301 and the shaft 221 at a position opposite the second rotor 220 with respect to the pulley 153. As a result, the stress exerted on the shaft 221 when stopping or driving the second rotor 220 can be reduced, thus minimizing twisting of the shaft 221 and enabling accurate detection of the second rotor rotation position.

Third Embodiment

Figure 9:
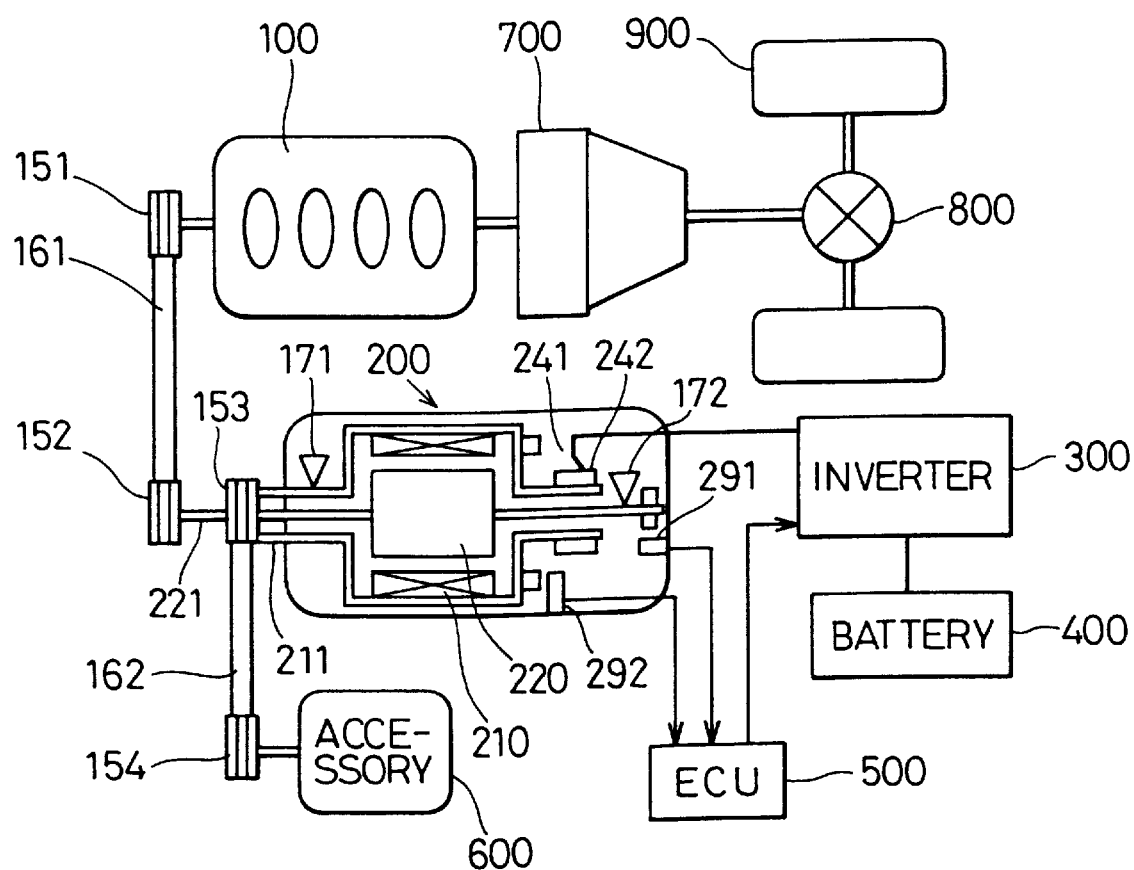
FIG. 9 is a schematic diagram showing a vehicle driving system that uses an accessory device driving apparatus for vehicles according to a third embodiment of the present invention.

In a third embodiment, as shown in FIG. 9, the first rotor 210 and the second rotor 220 are constructed as an armature-type and a field magnet type, respectively, as opposed to the first and the second embodiments. Further, the first rotor 210 and the second rotor 220 are coupled with the accessory device 600 and the engine 100, respectively, as opposed to the first and the second embodiments.

The present invention should not be limited to the above disclosed embodiments, but may be implemented in various other ways without departing from the spirit of the invention.

What is claimed is:

1. An accessory device driving apparatus for a vehicle having an engine, drive wheels coupled with the engine, an accessory device and a battery, the apparatus comprising:

a housing;

a first rotor rotatably supported in the housing and coupled with the engine in a torque transfer manner therebetween; and a second rotor rotatably supported in the housing and coupled with the accessory device in a torque transfer manner therebetween, wherein one of the rotors is connected to the battery in an electric power transfer manner and positioned to face another of the rotors in an electromagnetically induction-coupled manner and in a relatively rotatable manner, wherein the one of the rotors is controlled to start the engine and drive the accessory device, and wherein the first rotor is coupled with the engine to be rotatable at speeds higher than that of the engine.

2. The apparatus as in claim 1, further comprising:

a first rotor restriction member fixed to the housing to restrict the first rotor from rotating in a rotation direction opposite to that of the engine.

3. The apparatus as in claim 2, wherein the first rotor restriction member includes a one-way clutch.

4. The apparatus as in claim 1, further comprising:

a second rotor restriction member fixed to the housing to restrict the second rotor from rotating in a rotation direction opposite to that of the engine.

5. The apparatus as in claim 4, wherein the second rotor restriction member includes a one-way clutch.

6. An accessory device driving apparatus for a vehicle having an engine, drive wheels coupled with the engine, an accessory device and a battery, the apparatus comprising:

a housing;

a first rotor rotatably supported in the housing and coupled with the engine in a torque transfer manner therebetween; and a second rotor rotatably supported in the housing and coupled with the accessory device in a torque transfer manner therebetween, wherein one of the rotors is connected to the battery in an electric power transfer manner and positioned to face another of the rotors in an electromagnetically induction-coupled manner and in a relatively rotatable manner, wherein the one of the rotors is controlled to start the engine and drive the accessory device, and wherein the second rotor is coupled with the accessory device to be rotatable at speeds higher than that of the accessory device.

7. The apparatus as in claim 6, wherein a first rotor restriction member is fixed to the housing to restrict the first rotor from rotating in a rotation direction opposite to that of the engine.

8. The apparatus as in claim 7, wherein the first rotor restriction member includes a one-way clutch.

9. the apparatus as in claim 6, wherein a second rotor restriction member fixed to the housing to restrict the second rotor from rotating in a rotation direction opposite to that of the engine.

10. The apparatus as in claim 9, wherein the second rotor restriction member includes a one-way clutch.

11. An accessory device driving apparatus for a vehicle having an engine, drive wheels coupled with the engine, an accessory device and a battery, the apparatus comprising:

a housing;

a first rotor rotatably supported in the housing and coupled with the engine in a torque transfer manner therebetween;

a second rotor rotatably supported in the housing and coupled with the accessory device in a torque transfer manner therebetween, wherein one of the rotors is connected to the battery in an electric power transfer manner and positioned to face another of the rotors in an electromagnetically induction-coupled manner and in a relatively rotatable manner, and wherein the one of the rotors is controlled to start the engine and drive the accessory device;

a rotary shaft extending from an inside of the housing to an outside of the housing, the rotary shaft fixedly holding one of the rotors thereon in the inside of the housing; and a rotor restriction member fixedly held at the outside of the housing to restrict the rotary shaft from rotating in a predetermined direction opposite a direction of forward rotation of the engine.

12. An accessory device driving apparatus for a vehicle having an engine, an accessory device and a battery, the apparatus comprising:

a housing;

a first rotor rotatably supported in the housing and coupled with the engine in a torque transfer manner therebetween;

a second rotor rotatably supported in the housing and coupled with the accessory device in a torque transfer manner therebetween, wherein the second rotor is coupled with the accessory device to be rotatable at speeds higher than that of the accessory device, and wherein one of the rotors is connected to the battery in an electric power transfer manner and positioned to face another of the rotors in an electromagnetically induction-coupled manner and in a relatively rotatable manner.

13. An accessory device driving apparatus for a vehicle having an engine, an accessory device and a battery, the apparatus comprising:

a housing;

a first rotor rotatably supported in the housing and coupled with the engine in a torque transfer manner therebetween;

a second rotor rotatably supported in the housing and coupled with the accessory device in a torque transfer manner therebetween, wherein one of the rotors is connected to the battery in an electric power transfer manner and positioned to face another of the rotors in an electromagnetically induction-coupled manner and in a relatively rotatable manner; and a second rotor restriction member fixed to the housing to restrict the second rotor from rotating in a predetermined rotation direction.

14. The apparatus as in claim 13, wherein the second rotor restriction member includes a one-way clutch.

* * * * *